(12) United States Patent
Hwang et al.

(10) Patent No.: US 8,349,905 B1
(45) Date of Patent: Jan. 8, 2013

(54) PROTON-CONDUCTING POLYMER AND USES THEREOF

(75) Inventors: Inchul Hwang, Seongnam (KR); Nak Hyun Kwon, Seoul (KR); Young Taek Kim, Seoul (KR); Dong Il Kim, Incheon (KR); Ju Ho Lee, Incheon (KR); Jang-Bae Son, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/315,962

(22) Filed: Dec. 9, 2011

(51) Int. Cl.
*C08J 5/20* (2006.01)

(52) U.S. Cl. .......... 521/27; 528/125; 528/171; 528/295; 528/220; 528/373; 429/479; 429/480; 429/498; 429/493; 429/429

(58) Field of Classification Search ............... 528/373, 528/125, 171, 295, 220; 521/27; 429/479, 429/480, 498, 493, 429
See application file for complete search history.

(56) References Cited

U.S. PATENT DOCUMENTS

2010/0261091 A1* 10/2010 Lee et al. ............... 429/483

* cited by examiner

*Primary Examiner* — Shane Fang
(74) *Attorney, Agent, or Firm* — Edwards Wildman Palmer LLP; Peter F. Corless

(57) ABSTRACT

Disclosed herein is a proton-conducting polymer and uses thereof and, more particularly, a hydrocarbon-based proton-conducting polymer derived from a monomer having a multi-naphthyl group and comprising a plurality of acid groups on the side chain of the repeating unit, an electrolyte membrane comprising the polymer, a membrane-electrode assembly comprising the electrolyte membrane, and a fuel cell comprising the membrane-electrode assembly.

11 Claims, 3 Drawing Sheets

PROTON-CONDUCTING POLYMER AND USES THEREOF

CROSS-REFERENCE TO RELATED APPLICATION

This application claims under 35 U.S.C. §119(a) priority to and the benefit of Korean Patent Application No. 10-2011-0099337, filed on Sep. 29, 2011, the entire contents of which are incorporated herein by reference.

BACKGROUND OF THE INVENTION (a) Field of the Invention

The present invention relates to a hydrocarbon-based proton-conducting polymer, an electrolyte membrane including the polymer, a membrane-electrode assembly including the electrolyte membrane, and a fuel cell including the membrane-electrode assembly.

(b) Description of the Related Art

Polymer electrolyte fuel cells (PEFCs), also known as solid polymer electrolyte fuel cell (SPEFC), proton exchange membrane fuel cell (PEMFC), etc, are fuel cells that use a polymer membrane with proton exchange characteristics.

In contrast to other fuel cells, PEFCs are characterized by a low operating temperature of about 80° C., high efficiency, high current density, high output density, fast start-up time, and a rapid response to load changes. Particularly, PEFCs using a polymer membrane as an electrolyte do not require adjusting the electrolyte and not particularly sensitive to pressure changes of the reactive gas. PEFCs also feature a simple design, ease of fabrication, and a wide range of outputs; consequently, their use is well suited to a variety of applications, including power sources for zero emission vehicles, on-site generators, portable power sources, military power sources, and the like.

In PEFCs, the characteristics of the proton exchange membrane are usually described in terms of ion exchange capacity (IEC), or equivalent weight (EW). The polymer electrolyte membrane requirements for a fuel cell are high proton conductivity, high mechanical strength, and low permeability to gas and water. Resistance to dehydration is also required because the polymer electrolyte membrane of a fuel cell has a drastic drop in proton conductivity upon dehydration. The electrolyte membrane also needs to display strong resistance to the reactions (such as, e.g., oxidation/reduction reaction, hydrolysis, and the like) that directly affect the electrolyte membrane, as well as high bond strength to protons, and good homogeneity within the membrane. The electrolyte membrane should be able to maintain these properties for a defined period of time. As well as providing an electrolyte membrane meeting all these requirements, there is also a demand for developing low-cost and environmentally-friendly fabrication techniques in order to help commercialization of the electrolyte membrane.

The polymer electrolyte membranes are classified into perfluorinated electrolyte membranes, partially fluorinated electrolyte membranes, and hydrocarbon-based electrolyte membranes. The perfluorinated electrolyte membranes are commercially available as Nafion® from Dufont, Aciplex® from Asahi Chemical, Flemion® from Asahi Glass, etc. These commercially available perfluorinated electrolyte membranes suffer from several major drawbacks. For example, they have a very high cost of production, high methanol permeability, and their conductivity decreases dramatically at high temperature.

Compared with the perfluorinated electrolyte membranes, the partially fluorinated electrolyte membranes feature a lower production cost and a higher physical/chemical stability; unfortunately, they have a significantly shorter life time.

The hydrocarbon-based electrolyte membranes may include, for example, polyimide (PI), polysulfone (PSU), polyether ketone (PEK), polyarylene ether sulfone (PAES), polybenzimidazole (PBI), polyphenylene oxide (PPO), and the like. In comparison to the perfluorinated or partially fluorinated electrolyte membranes, the hydrocarbon-based electrolyte membrane features a lower production cost, and a higher thermal stability, which minimizes the drop in conductivity at a high temperature.

Introducing hydrophilic ionic groups into the hydrocarbon-based electrolyte membrane enhances conductivity, but a rise of the conductivity up to the level of the perfluorinated electrolyte membrane may cause excessive swelling of the electrolyte membrane, which results in a deterioration of the mechanical strength of the membrane. Furthermore, excessive swelling of the electrolyte membrane causes the electrolyte membrane to dissolve in water, thereby reducing the life expectancy of the membrane as a result of gradual dissolution of the electrolyte membrane. Additionally, methanol permeability increases with an increase in the water uptake.

In an attempt to solve these problems with the hydrocarbon-based electrolyte membranes, there have been proposed a variety of methods, such as the introduction of a covalent cross-linking structure to reduce the solubility of the electrolyte membranes in water and to inhibit the elution of the resin.

For example, Sumiko Matsumura et al. in McGill University of Canada proposed a synthesis method for a proton-conducting polymer that includes introducing a hexaphenyl structure at the polymer end and then conducting sulfonation of the polymer (see, e.g., *Macromolecules*, volume 41, pp. 281-284). This provides a proton-conducting polymer in which the molecular weight and the degree of sulfonation can be varied by controlling the length of the polymer chain and the number of chains. However, the introduction of a hexaphenyl structure at the polymer end results in a limit on the number of sulfonic acid groups available on the polymer, so the proton-conducting polymer fails to have good performances as a substitute for the commercially available products.

A variety of methods have also been proposed for compensating for these disadvantages of the hydrocarbon-based electrolyte membrane, however, no commercially viable solutions have yet emerged.

SUMMARY OF THE INVENTION

Accordingly, the present invention provides a proton-conducting polymer that has a plurality of proton-conducting groups and enables the preparation of an electrolyte membrane with excellent dimensional stability, ion exchange capacity, and proton conductivity. The present invention also provides an electrolyte membrane comprising the proton-conducting polymer.

In accordance with the present invention, there is provided a proton-conducting polymer represented by the following Formula 1:

[Formula 1]

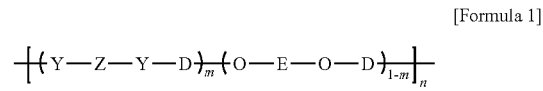

In Formula 1, m is 0.01 to 0.99;
n is an integer from 10 to 1,000;
Y is independently a chemical bond, oxygen (O), or sulfur (S);
D and E are independently a divalent linking group comprising at least one member selected from the group consisting of a substituted or unsubstituted C1-C10 alkylene group, a substituted or unsubstituted C2-C10 alkenylene group, a substituted or unsubstituted C6-C20 arylene group, a sulfonyl group (—(SO$_2$)—), and a carbonyl group (—(C=O)—); and
Z is represented by the following Formula 2a:

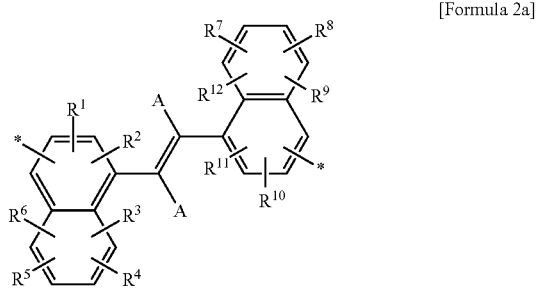

[Formula 2a]

In Formula 2a, A is independently any one of substituents represented by the following Formula 3a:

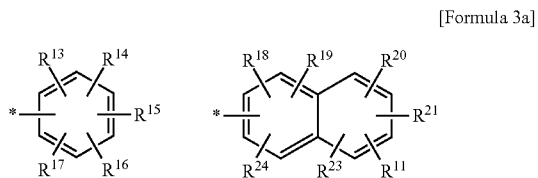

[Formula 3a]

In the Formulas 2a and 3a, $R^1$ to $R^{24}$ are independently hydrogen; a sulfonic acid group (—SO$_3$M); a phosphate group (—PO$_3$M); a carboxylic acid group (—CO$_2$M, where M is H$^+$, Na$^+$, or K$^+$); a sulfonyl group; or a C1-C10 alkyl or C6-C20 aryl group substituted with a sulfonic acid group, a phosphate group, a carboxylic acid group, or a sulfonyl group.

The proton-conducting polymer may be a random copolymer or a block copolymer.

The proton-conducting polymer may have a weight average molecular weight of 5,000 to 1,000,000.

In accordance with the present invention, there is also provided an electrolyte membrane including the proton-conducting polymer.

In accordance with the present invention, there is also provided a membrane-electrode assembly including the electrolyte membrane, and a fuel cell including the membrane-electrode assembly.

The proton-conducting polymer according to the present invention, including a multi-naphthyl group on the side chain of the repeating unit, may locally introduce a plurality of acid groups with ease and have a flexible polymer chain. The proton-conducting polymer may also have a relatively long hydrophobic region and effectively form a subtle separation between hydrophilic and hydrophobic regions, thereby providing higher dimensional stability than that of other polymers having a same number of acid groups.

Consequently, the electrolyte membrane including the proton-conducting polymer exhibits high dimensional stability, great ion exchange capacity, high proton conductivity, and low methanol permeability, and thus enables the preparation of a polymer electrolyte membrane for fuel cell that is more stable and enhanced in performance.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
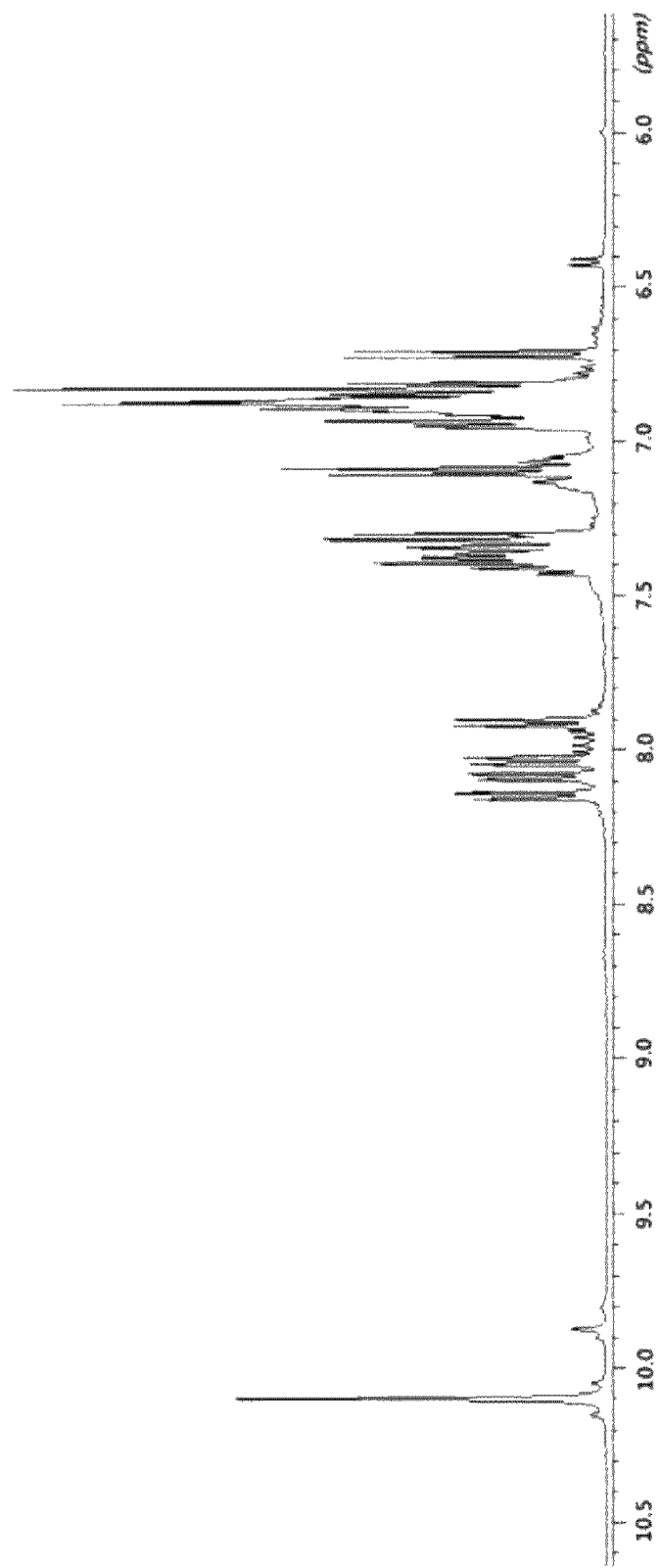
FIG. 1 is a graph showing the nuclear magnetic resonance (NMR) spectrum for a monomer included in the proton-conducting polymer according to one example of the present invention.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Hereinafter, a detailed description will be given as to a polyarylene-based polymer, a preparation method for the same, and a polymer electrolyte membrane for fuel cell using the polymer according to the preferred embodiments of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9.

Hereinafter, a detailed description will be given as to a proton-conducting polymer and uses thereof according to the present invention.

If not stated otherwise in this specification, a part denoted by '*' in the chemical formulas refers to a portion bonded in the main polymer chain.

The technical terms as used herein are given only to mention a specific example and not intended to confine the present invention. The singular forms as used herein are intended to include the plural forms as well, unless expressly stated otherwise. The terms "includes", "comprises", "including" and/or "comprising" as used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms as used herein have the same meanings as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the examples of the present invention will be described with reference to the accompanying drawings. The present invention may, however, be embodied in different forms and should not be constructed as limited to the examples set forth herein.

The inventors of the present invention, through repeated studies on the proton-conducting polymers, discovered that a polymer having a multi-naphthyl group on the side chain of the repeating unit may have more acid groups locally introduced than a polymer having acid groups at the polymer end, making it easier to control the degree of acidification. Additionally, it has been discovered by the inventors that such a polymer may effectively provide a subtle separation between hydrophilic and hydrophobic regions, thereby establishing good dimensional stability.

In accordance with one embodiment of the present invention, there is provided a proton-conducting polymer represented by the following Formula 1:

[Formula 1]

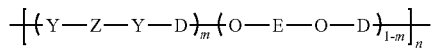

In Formula 1, m is 0.01 to 0.99;

n is an integer from 10 to 1,000;

Y is independently a chemical bond, oxygen (O), or sulfur (S);

D and E are independently a divalent linking group comprising at least one member selected from the group consisting of a substituted or unsubstituted C1-C10 alkylene group, a substituted or unsubstituted C2-C10 alkenylene group, a substituted or unsubstituted C6-C20 arylene group, a sulfonyl group ($-(SO_2)-$), and a carbonyl group ($-(C=O)-$); and Z is represented by the following Formula 2a:

[Formula 2a]

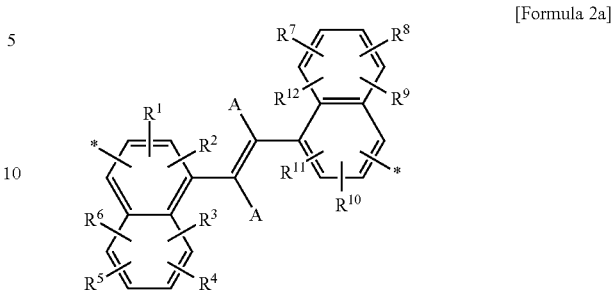

In Formula 2a, A is independently any one of the substituents represented by the following Formula 3a:

[Formula 3a]

In the Formulas 2a and 3a, $R^1$ to $R^{24}$ are independently hydrogen; a sulfonic acid group ($-SO_3M$); a phosphate group ($-PO_3M$); a carboxylic acid group ($-CO_2M$, wherein M is $H^+$, $Na^+$, or $K^+$); a sulfonyl group; or a C1-C10 alkyl or C6-C20 aryl group substituted with a sulfonic acid group, a phosphate group, a carboxylic acid group, or a sulfonyl group.

Generally, the proton-conducting polymer has a proton conductivity enhanced by an increase in the introduction rate of acid groups, such as sulfonic acid groups; however, this has the effect of causing a proportional increase in the uptake of water, which lowers mechanical strength and increases methanol permeability, thereby resulting in a deterioration of the performance of the polymer electrolyte membrane. Hence, there is a demand for development of polymers with high proton conductivity and good dimensional stability.

As can be seen from the Formulas 1, 2a and 3a, a proton-conducting polymer of the present invention includes a multi-phenyl structure (preferably a multi-naphthyl structure) on the side chain of the repeating unit, so a plurality of acid groups (preferably sulfonic acid groups) can be introduced at the position of the multi-phenyl structure. Accordingly, it is therefore easy to control in the degree of acidification of the proton-conducting polymer, which makes it possible to provide an electrolyte membrane having high ion exchange capacity and high proton conductivity.

The proton-conducting polymer of the present invention, which includes acid groups introduced on the side chain of the repeating unit, is preferred to the polymer having acid groups in the main chain in terms of securing flexibility of the polymer chain and improving formation of channels for cation conduction. Further, the proton-conducting polymer of the present invention, which includes a large number of acid groups locally introduced at the position of the multi-phenyl structure in each repeating unit, has a structure providing effective formation of a subtle separation between a hydrophilic region (i.e., the right-sided repeating unit of the polymer) and a hydrophobic region (i.e., the left-sided repeating unit) and thus provides superior dimensional stability to other polymers having a same number of acid groups.

In the Formula 1, Z includes a multi-phenyl structure (preferably, a multi-naphthyl structure), as shown in the formulas 2a and 3a. Introducing a plurality of acid groups into the multi-phenyl structure may increase the proton conductivity.

In other words, the polymer electrolyte membrane including the proton-conducting polymer functions as a proton exchange membrane when protons are bonded as cations to an anionic acid group, and maintains much higher proton conductivity in the presence of water molecules. With water molecules, the acid group bonded to the electrolyte membrane disassociates into an anion and a proton, and a concentration gradient or electric field causes the proton to move as in an electrolyte.

The acid group introduced into the polymer may be any acid group that participates in the above-described mechanism for cation conduction and is not specifically limited in its construction.

Preferably, the acid group introduced into the polymer may be a sulfonic acid group (—$SO_3M$); a phosphate group (—$PO_3M$); a carboxylic acid group (—$CO_2M$, where M is $H^+$, $Na^+$, or $K^+$); a sulfonyl group; or a C1-C10 alkyl or C6-C20 aryl group substituted with a sulfonic acid group, a phosphate group, a carboxylic acid group, or a sulfonyl group. Hence, in the Formulas 2a and 3a, $R^1$ to $R^{24}$ may be independently any one of the above-mentioned acid groups, unless they are all hydrogen.

In particular, the acid group having a carbon-sulfur (C—S) bond has a very high acidity and a high resistance to oxidizing conditions, so a sulfonic acid group (—$SO_3M$) is preferred.

In the Formula 1, D and E may be independently a divalent linking group including at least one selected from the group consisting of a substituted or unsubstituted C1-C10 alkylene group, a substituted or unsubstituted C2-C10 alkenylene group, a substituted or unsubstituted C6-C20 arylene group, a sulfonyl group (—($SO_2$)—), and a carbonyl group (—(C=O)—).

The alkylene group may be a divalent linear or branched saturated hydrocarbon having 1 to 10 carbon atoms, preferably 1 to 6 carbon atoms. For example, the alkylene group may include, but is not limited to, methylene, ethylene, propylene, butylene, and the like. In the alkylene group, at least one hydrogen may be substituted with a halogen atom, a cyano group, a C1-C5 alkyl group, or a C1-C5 alkoxy group.

The alkenylene group may be a divalent linear or branched saturated hydrocarbon having 2 to 10 carbon atoms, preferably 2 to 6 carbon atoms with at least one carbon-carbon double bond. For example, the alkenylene group may include, but is not limited to vinylene, prophenylene, butenylene, pentenylene, and the like. In the alkenylene group, at least one hydrogen may be substituted with a halogen atom, a cyano group, a C1-C5 alkyl group, or a C1-C5 alkoxy group.

The arylene group may be a divalent mono-, bi- or tri-cyclic aromatic hydrocarbon having 6 to 20 ring-carbon atoms, preferably 6 to 12 ring-carbon atoms. For example, the arylene group may include, but is not limited to phenylene, biphenylene, terphenylene, naphthalene, and the like. In the arylene group, at least one hydrogen may be substituted with a halogen atom, a cyano group, a C1-C5 alkyl group, or a C1-C5 alkoxy group.

Further, the divalent linking group including at least one member selected from the group consisting of the alkylene group, the alkenylene group, the arylene group, the sulfonyl group (—($SO_2$)—), and the carbonyl group (—(C=O)—) may be a divalent linking group having a structure of, for example, diphenyl sulfone, diphenyl ketone, phenylene methylene phenylene, etc.

According to one embodiment of the present invention, D may be independently a divalent linking group derived from a compound selected from the group represented by the following Formula 4a:

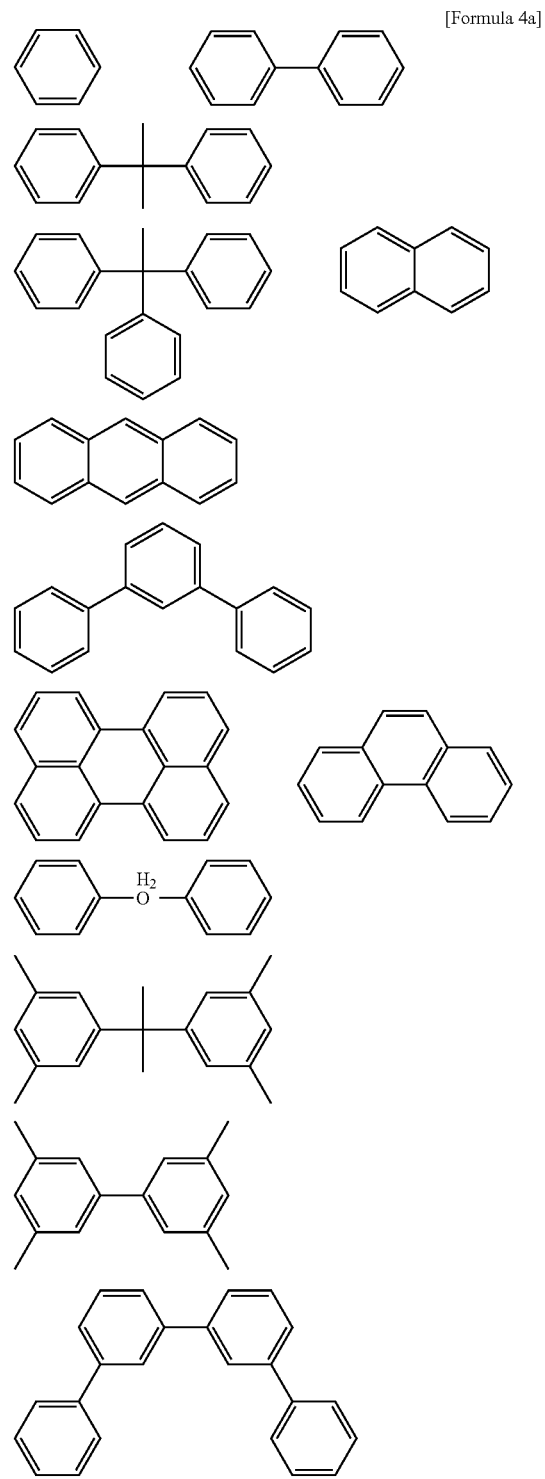

[Formula 4a]

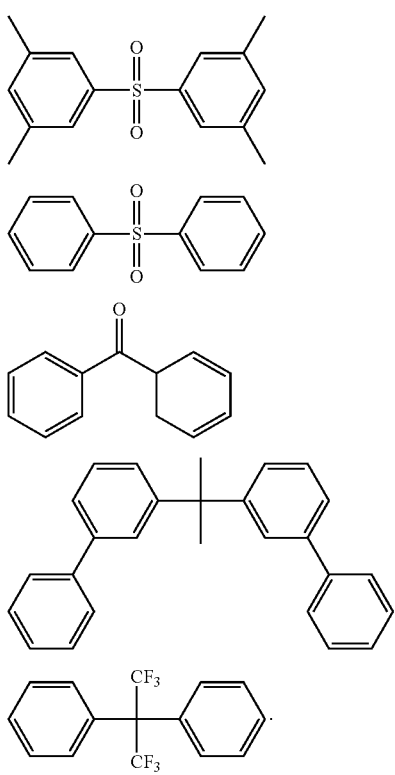

According to one embodiment of the present invention, E may be independently a divalent linking group derived from a compound selected from the group represented by the following Formula 5a:

[Formula 5a]

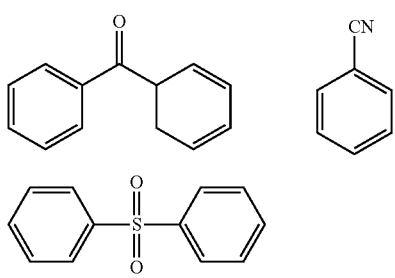

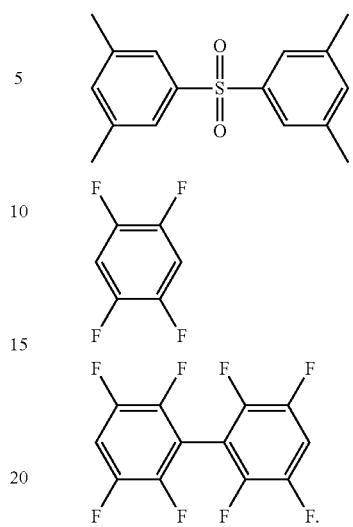

In the Formula 1, Y may be independently a chemical bond, hydrogen (O), or sulfur (S), preferably oxygen (O).

In the Formula 1, m is the molar fraction of a repeating unit comprising a multi-phenyl structure, preferably in the range of 0.01 to 0.99. As an acid group such as a sulfonic acid group is introduced into the multi-phenyl structure, m indicates the degree of acidification (e.g., the degree of sulfonation) of the polymer. When m is 0.2, for example, the degree of acidification of the polymer is 20%.

In the Formula 1, n is the degree of polymerization, preferably an integer from 10 to 1,000. In consideration of mechanical properties, proton conductivity, etc., the proton-conducting polymer of the present invention may have a molecular weight average of 5,000 to 1,000,000, preferably 5,000 to 600,000, more preferably 5,000 to 300,000. It is further contemplated that the average molecular weight may range from 5,000 to 50,000, 100,000, 200,000, 300,000, 400,000, 500,000, 600,000, 700,000, 800,000, or 900,000. Is also contemplated within the scope of the invention that the average molecular weight may range from 1,000,000 to 900,000, 800,000, 700,000, 600,000, 500,000, 400,000, 300,000, 200,000, 100,000, 10,000, or 5,000.

The proton-conducting polymer may be a random copolymer or a block copolymer, preferably, a block copolymer having a repeating block of hydrophobic and hydrophilic regions for use in electrolyte membranes.

The proton-conductive polymer of the present invention may include, for example, the following Formula 6a or 6b.

[Formula 6a]

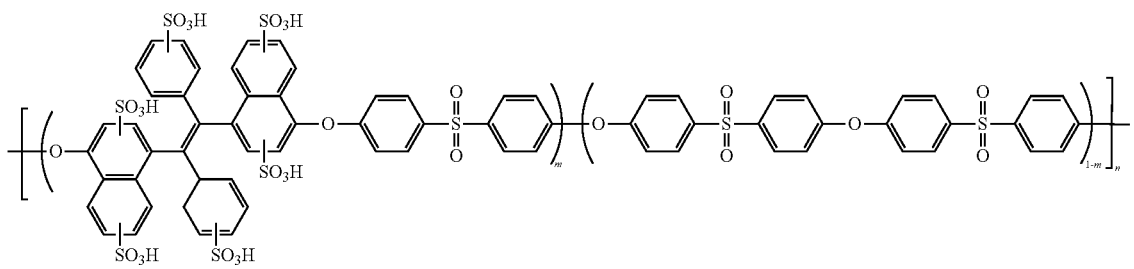

-continued

[Formula 6b]

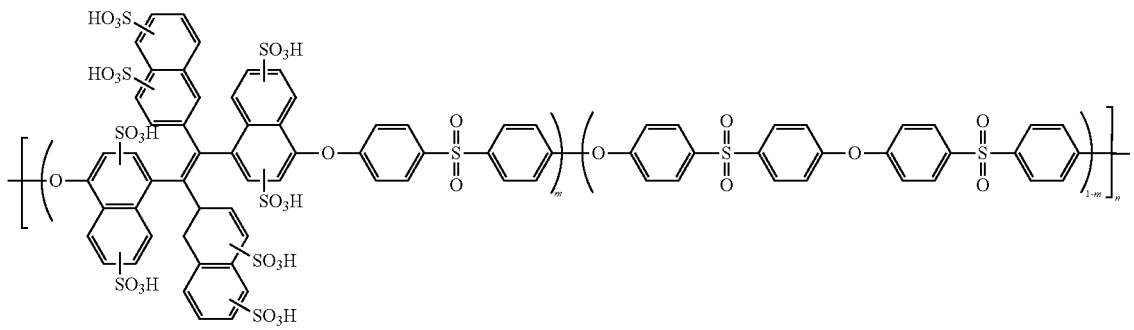

The formulas 6a and 6b are only an illustrative example of the proton-conducting polymer of the Formula 1 according to the present invention and are not intended to limit the present invention.

The proton-conducting polymer of the present invention may be used in a variety of applications using a proton-conducting polymer. For example, the polymer may be used for energy storage, generator devices such as fuel cells, solar cells, secondary cells, super capacitor, and the like, and also for organic electroluminescent devices.

As one embodiment of a preparation method for the proton-conducting polymer represented by the Formula 1, the present invention provides a method for preparing a proton-conducting polymer that includes:

copolymerizing a compound represented by the following Formula 2b, at least one compound selected from the group represented by the following Formula 4b, and at least one compound selected from the group represented by the following Formula 5b; and introducing an acid group into the polymer obtained by the copolymerization.

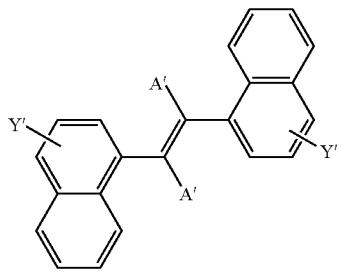

[Formula 2b]

In Formula 2b, Y' is independently a leaving group, —OH, or —SH;

A' is independently any one of substituents represented by the following Formula 3b.

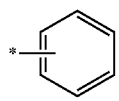 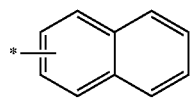

[Formula 3b]

HO-E-OH [Formula 4b]

X-D-X [Formula 5b]

In the formulas 4b and 5b, D and E are as defined above; and X is independently a halogen group.

The preparation method is only an exemplary embodiment for preparing the above-described proton-conducting polymer and is not intended to limit the present invention. Further, the preparation method may further include additional steps that are generally conducted in the art of the present invention, before or after the respective steps.

Hereinafter, a description will be given as to the respective steps of the preparation method according to one embodiment of the present invention.

Copolymerization

As shown in the following reaction scheme 1, the copolymerization step is to synthesize a copolymer from monomer compounds by condensation polymerization, which is conducted through a nucleophilic substitution reaction via an activation step and a polymerization step.

[Reaction Scheme 1]

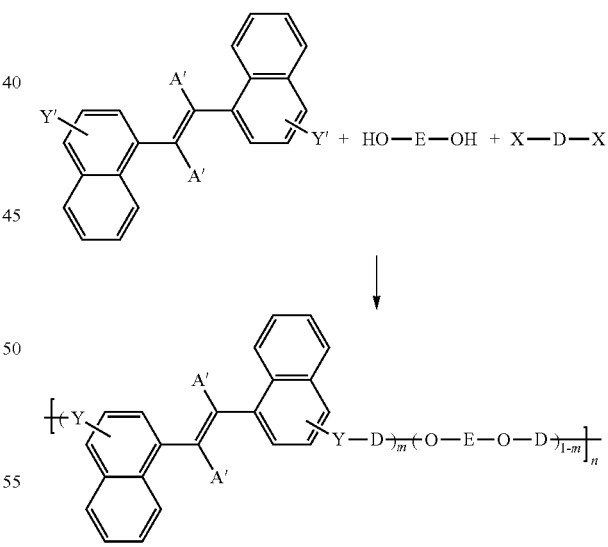

In the reaction scheme 1, E, D, m and n are as defined above.

The value of m in the Formula 1 may be determined by the equivalent weight ratio of each compound. According to the present invention, the added amount of each compound may be controlled within a range satisfying that the sum of the equivalent weights of the compounds of the formulas 2b and 4b is equal to the equivalent weight of the compound of the Formula 5b.

More specifically, the equivalent weight ratio, that is, [the equivalent weight of the compound of the Formula 2b]:[the equivalent weight of the compound of the Formula 4b]:[the equivalent weight of the compound of the Formula 5b] may be, for example, (0.05:0.05:1), (0.1:0.9:1), (0.15:0.85:1), (02: 0.8:1), (0.25:0.75:1), (0.3:0.7:1), (0.35:0.65:1), (0.4:0.6:1), (0.45:0.55:1), (0.5:0.5:1), (0.55:0.45:1), (0.6:0.4:1), (0.65: 0.35:1), (0.7:0.3:1), (0.75:0.25:1), (0.8:0.2:1), (0.85:0.15:1), (0.9:0.1:1), or (0.95:0.05:1), which are not intended to limit the scope of the present invention.

The equivalent weight ratio of the compound of the Formula 2b may be the value of m in the Formula 1 and indicate the degree of acidification (e.g., the degree of sulfonation) of the polymer.

The copolymerization step may be conducted in the presence of an organic solvent, which is not specifically limited in its composition and may include any organic solvent that dissolves the reactants and the product.

In one embodiment, the organic solvent may be at least one organic solvent selected from the group consisting of dimethylacetamide, N-methylpyrrolidone, dimethylformamide, dimethyl sulfoxide, methylene chloride, chloroform, and tetrahydrofuran.

The organic solvent may be used in combination with a hydrocarbon-based solvent such as benzene, toluene, xylene, and the like. The organic solvent and the hydrocarbon-based solvent may be mixed at a volume ratio of about 10:1.

The copolymerization step may be conducted in the presence of a catalyst, which is preferably an alkali metal carbonate such as $K_2CO_3$, $Na_2CO_3$, and the like.

The reaction temperature and the reaction time of the copolymerization step may be controlled in consideration of the molecular weight of the polymer product. According to the present invention, the copolymerization reaction may be conducted at a temperature of 100° C. to 200° C. for 30 minutes to 48 hours.

More specifically, according to the present invention, the copolymerization reaction is conducted under stirring at 120° C. to 160° C. for 3 to 10 hours, and while water is removed as an azeotrope through distillation using a Dean-Stark trap, the reaction is continued with stiffing at 170° C. to 190° C. for 4 to 24 hours. If needed during the reaction, a solvent such as toluene, or the like. may be added using an addition funnel to remove water.

Introduction of Acid Group into Copolymer

This step is to introduce an acid group into the above-synthesized copolymer, as shown in the following reaction scheme 2, so an acid group can be introduced at the copolymerized position of the Formulas 2b and 3b.

[Reaction Scheme 2]

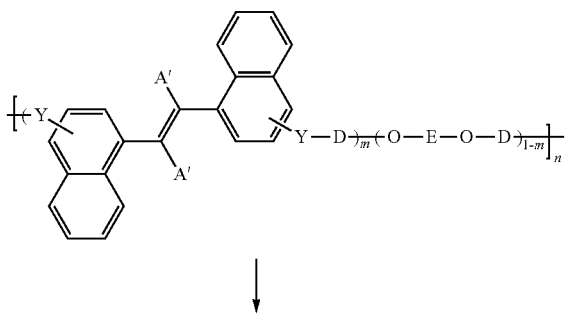

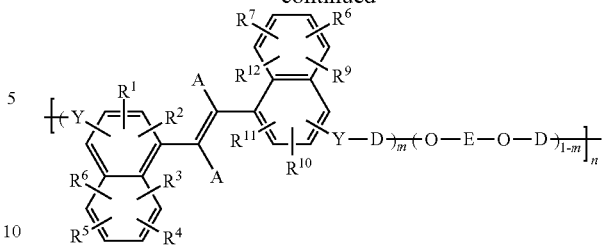

In the reaction scheme 2, A, E, D, m and n are as defined above.

The acid group may be a sulfonic acid group (—$SO_3M$); a phosphate group (—$PO_3M$); a carboxylic acid group (—$CO_2M$, wherein M is $H^+$, $Na^+$, or $K^+$); a sulfonyl group; or a C1-C10 alkyl or C6-C20 aryl group substituted with a sulfonic acid group, a phosphate group, a carboxylic acid group, or a sulfonyl group.

The step of introducing an acid group into the copolymer may be conducted by a general method of causing the copolymer to react with a sulfonic acid compound, a phosphate compound, a carboxylic acid compound, and/or the like.

The sulfonic acid compound may be any sulfonic acid compound known to those skilled in the art, preferably at least one compound selected from the group consisting of concentrated sulphuric acid ($H_2SO_4$), chlorosulfonic acid ($ClSO_3H$), fuming sulfuric acid (fuming $SO_3$), and fuming sulfuric acid triethylphosphate ($SO_3$-TEP).

The phosphate compound may be any phosphate compound known to those skilled in the art, preferably diethylphosphite, phosphoric acid, or their mixtures. The carboxylic acid compound may also be any carboxylic acid compound known to those skilled in the art and is not specifically limited. Instead of using a phosphate compound or a carboxylic acid compound to introduce an acid group, there may be used a method of copolymerizing monomers containing a phosphate group or a carboxylic acid group to prepare a copolymer having acid groups.

The step of introducing an acid group into the copolymer may be conducted at 0° C. to 150° C. for 12 to 60 hours, preferably at 20° C. to 100° C. for 12 to 48 hours.

In accordance with another embodiment of the present invention, there is provided an electrolyte membrane comprising the proton-conducting polymer.

The thickness of the electrolyte membrane may be in the range of 10 to 200 μm. It is contemplated within the scope of the invention that the thickness may be in the range of about 10 to about 20, 30, 40, 50, 60, 70, 80, 90, 100, 110, 120, 130, 140, 150, 160, 170, 180, 190, or 200 μm. Alternatively, the thickness may be in the range of about 200 to about 190, 180, 170, 160, 150, 140, 130, 120, 110, 100, 90, 80, 70, 60, 50, 40, 30, 20, or 10 μm, The electrolyte membrane may be prepared by dissolving the above-described proton-conducting polymer in an organic solvent and then processing the resultant composition by a general method, such as casting or heat-pressure forming.

The organic solvent may be dimethylacetamide, dimethylacrylic acid, N-methylpyrrolidone, dimethylformamide, and/or the like.

In fabrication of the electrolyte membrane, any additional constituent components for preparation of electrolyte membranes as known to those skilled in the art may be used as well as the proton-conducting polymer of the present invention.

In addition to the proton-conducting polymer of the present invention, the electrolyte membrane may further include at least one polymer selected from the group consisting of polyimide, polyether ketone, polysulfone, polyether sulfone, polyether ether sulfone, polybenzimidazole, polyphenylene oxide, polyphenylene sulfide, polystyrene, polytrifluoro styrene sulfonic acid, polystyrene sulfonic acid, polyvinylidene fluoride, polyurethane, and a branched sulfonated polysulfone ketone copolymer.

When the electrolyte membrane includes an additional polymer, the proton-conducting polymer of the present invention may be used, based on the total weight of the polymer, in a controlled amount of 1 to 99 wt %, preferably 30 to 97 wt %, more preferably 60 to 95 wt %. Including both the proton-conducting polymer of the present invention and an additional polymer is preferable in securing higher cation conductivity. It is further contemplated that the total weight of the polymer may range from about 1 to about 10, 20, 30, 40, 50, 60, 70, 80, 90, or 99 wt %. Alternatively, the total weight of the polymer may range from about 99 to about 90, 80, 70, 60, 50, 40, 30, 20, 10 of 1.

In addition to the proton-conducting polymer of the present invention, the electrolyte membrane may further comprise an inorganic substance for securing dimensional stability. The inorganic substance may be at least member one selected from the group consisting of silicon oxide ($SiO_2$), titanium dioxide ($TiO_2$), inorganic phosphate, sulfonated silicon dioxide (sulfonated $SiO_2$), sulfonated zirconium oxide (sulfonated ZrO), and sulfonated zirconium phosphate (sulfonated ZrP). The inorganic substance may be used, based on 100 parts by weight of the proton-conducting polymer of the present invention, in an amount of 5 to 50 parts by weight, preferably 7 to 35 parts by weight, more preferably 9 to 25 parts by weight.

In addition to the proton-conducting polymer of the present invention, the electrolyte membrane may further comprise a porous support having nanoscale particles (preferably 0.1 to 300 nm). The nanoscale particles may be at least one selected from the group consisting of silica, alumina, zirconia, and zeolite.

In accordance with still another embodiment of the present invention, there are provided a membrane-electrode assembly and a fuel cell that comprise the polymer electrolyte membrane.

The membrane-electrode assembly comprises a cathode, an anode, and the polymer electrolyte membrane of the present invention sandwiched between the two electrodes.

The fuel cell further comprises a separator attached to either side of the membrane-electrode assembly comprising the polymer electrolyte membrane of the present invention. If necessary, the separator may optionally include a reformer, a fuel tank, a fuel pump, or the like.

The fuel cell may comprise a plurality of the membrane-electrode assemblies.

The cathode and the anode comprise a gas diffusion layer, and a catalyst layer.

The catalyst layer comprises a metallic catalyst for accelerating the oxidation reaction of hydrogen, and the reduction reaction of oxygen. Preferably, the catalyst layer comprises at least one member selected from the group consisting of platinum, ruthenium, osmium, platinum-osmium alloy, platinum-palladium alloy, and platinum-M alloy, where M is Ga, Ti, V, Cr, Mn, Fe, Co, Ni, Cu, or Zn). It is particularly preferable that the catalyst layer comprises platinum, ruthenium, osmium, platinum-ruthenium alloy, platinum-osmium alloy, platinum-palladium alloy, platinum-cobalt alloy, platinum-nickel alloy, or their mixtures.

The metallic catalyst is supported on a substrate. The substrate may be a carbon-based material such as acetylene black, black salt, or the like; or inorganic particles such as alumina or silica. For example, the substrate supporting the catalyst has porosity with a surface area of at least 150 $m^2/g$, preferably 500 to 1,200 $m^2/g$, and an average particle diameter of 10 to 300 nm, preferably 20 to 100 nm.

The gas diffusion layer may include, but is not specifically limited to, carbon paper, or carbon cloth. The gas diffusion layer acts as a support for electrode components for fuel cell and diffuses a reactive gas into the catalyst layer to facilitate gas transport to the catalyst layer. Preferably, the gas diffusion layer is carbon paper or carbon cloth embedded with a fluoropolymer resin such as polytetrafluoroethylene for water repellency. The water-repellent carbon paper or carbon cloth may prevent a deterioration in the gas diffusion efficiency caused by water produced when operating the fuel cell.

The electrodes may further include a microporous layer for promoting the gas diffusion efficiency between the gas diffusion layer and the catalyst layer.

The microporous layer may be prepared by depositing a composition including a conductive material (e.g., carbon powder, carbon black, active carbon, acetylene black, etc.), a binder (e.g., polytetrafluoroethylene), and, if needed, an ionomer.

The cathode and/or the anode may be prepared as follows. Firstly, a catalyst powder, a binder, and a mixed solvent are blended to prepare a catalyst slurry. The catalyst powder is as described above and may be metal particles which are on a carbon-based support or not. Preferably, the metal particles are platinum. The mixed solvent and the binder are not specifically limited and may be any solvent and binder commonly known to those skilled in the art. The catalyst slurry is put on the gas diffusion layer via a coater and dried to provide a cathode and/or an anode comprising the catalyst layer and the gas diffusion layer.

The polymer electrolyte membrane according to one example of the present invention is inserted between the cathode and the anode, which is then subjected to thermo-compression bonding to prepare a membrane-electrode assembly. The conditions of the thermo-compression bonding may include, for example, a pressure of 500 to 2,000 psi, a temperature of 50° C. to 300° C., and a compression time of 1 minute to 60 minutes.

Separators are added to the membrane-electrode assembly to form a generator. Each separator is attached to either side of the membrane-electrode assembly, and the separator on the anode is called "an anode separator", the separator on the cathode is called "a cathode separator". The anode separator has a passage for supply of a fuel and acts as an electron conductor for the transport of electrons generated from the anode to an external circuit or an adjacent unit cell. The cathode separator has a passage for supply of an oxidizing agent to the cathode and acts as an electron conductor for a transport of electrons supplied from an external circuit or an adjacent unit cell to the cathode. Subsequently, at least one reformer, a fuel tank, a fuel pump, or the like is optionally added to the generator to complete a fuel cell.

According to the present invention, the fuel cell may be a direct methanol fuel cell.

According to the present invention, the fuel cell may also be a fuel cell for vehicles. The vehicles includes all types of land vehicles, including transport vehicles, such as automobile, trucks, etc., and other vehicles, such as excavators, forklifts, etc. The configuration and the output power of the fuel cell may be properly modified according to the use purpose of the fuel cell. For example, fuel cells with high power density are suitable for start-up and sudden acceleration of automobiles that require a great amount of current for a short time.

Hereinafter, preferred examples of the present invention will be given to help the understanding of the present invention.

EXAMPLES AND COMPARATIVE EXAMPLES

Example 1

A dihydroxy monomer (compound C) comprising a multi-naphthyl group was synthesized according to the following reaction scheme 3.

cooled down to 0° C. Boron tribromide (BBr₃) was slowly added to the solution. The resulting solution was heated to the room temperature and kept for about 12 hours for a reaction. Subsequently, pure water was added to the reaction solution to complete the reaction. The organic phase was extracted with chloroform, removed from the solvent with the rotary evaporator, and then recrystallized with methanol to yield the compound C.

Nuclear magnetic resonance ($^1$H NMR) spectrometer was used to identify the compound C. The spectrum is presented in FIG. 1.

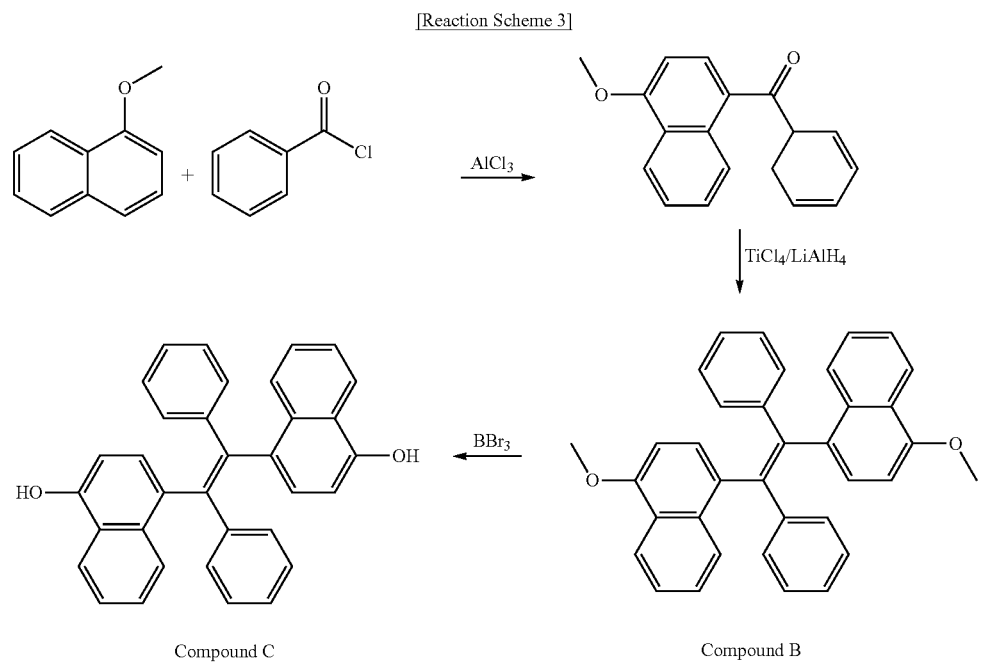

Compound C                   Compound B

More specifically, about 1 equivalent weight of methyoxynaphthalene and about 1.1 equivalent weight of benzoic acid chloride were dissolved in methane dichloride to prepare a reactant solution. The reactant solution was cooled down to 0° C., and about 1.2 equivalent weight of aluminum chloride was slowly added to the solution. The resultant reaction was heated to the room temperature and stored for about 12 hours for a reaction. Subsequently, pure water was added to the reaction solution to complete the reaction. The organic phase was extracted with methanol dichloride, the solvent was removed with a rotary evaporator, and then recrystallized with toluene to yield the compound A.

Titanium tetrachloride (TiCl₄) and lithium aluminum hydride (LiAlH₄) were put in tetrahydrofuran (THF), which was then heated under reflux. The compound A was slowly added to a separate THF solution. The resultant solution was heated under reflux for about 3 hours and cooled down. A 1M HCl solution was used to complete the reaction. The organic phase was extracted with dimethyl ether, removed of the solvent with the rotary evaporator, and then recrystallized with n-hexane to yield the compound B.

Subsequently, the compound B was dissolved in methane dichloride to prepare a reactant solution, which was then Example 2-1

A polymer (m=0.2) represented by the following Formula 7a was synthesized as follows.

First, about 2 equivalent weight of the compound C, about 8 equivalent weight of bis(4-hydroxyphenyl)sulfone, about 10 equivalent weight of bis(4-fluorophenyl)sulfone, and about 12 equivalent weight of potassium carbonate (K₂CO₃) were dissolved in N-methylpyrrolidone. Toluene was then added to the solution.

The resulting solution was put in a reactor, which was heated to about 160° C. to eliminate water and then toluene from the solution through 4-hour azeotropic distillation. The reactor was heated to about 190° C., kept for about 12 hours for a reaction, and cooled down to the room temperature to complete the reaction.

After a filtration of the reactant solution, a mixed solution containing isopropanol and ultrapure water at a weight ratio of 8:2 was used to form a precipitate as the polymer of the Formula 7a.

Nuclear magnetic resonance ($^1$H NMR) spectrometer was used to identify the polymer of the Formula 7a. The spectrum is presented in FIG. 2.

[Formula 7a]

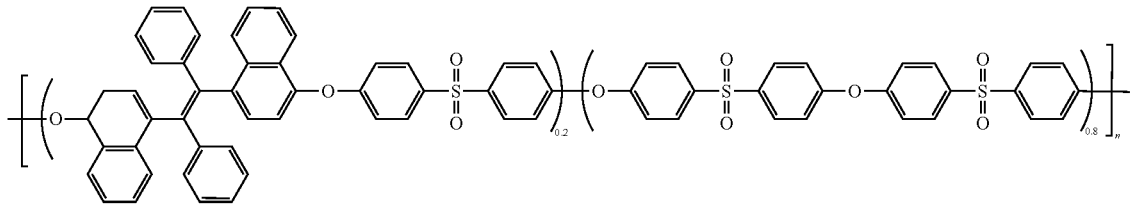

Example 2-2

A polymer (m=0.25) represented by the following Formula 7b was synthesized as follows.

First, about 2.5 equivalent weight of the compound C, about 7.5 equivalent weight of bis(4-hydroxyphenyl)sulfone, about 10 equivalent weight of bis(4-fluorophenyl)sulfone, and about 12 equivalent weight of potassium carbonate ($K_2CO_3$) were dissolved in N-methylpyrrolidone. Toluene was then added to the solution.

The resulting solution was put in a reactor, which was heated to about 160° C. to eliminate water and then toluene from the solution through 4-hour azeotropic distillation. The reactor was more heated to about 190° C., kept for about 12 hours for a reaction, and cooled down to the room temperature to complete the reaction.

After a filtration of the reactant solution, a mixed solution containing isopropanol and ultrapure water at a weight ratio of 8:2 was used to form a precipitate as the polymer of the Formula 7b.

reactant solution was put in a reactor and heated to about 60° C. for about 12 hours for a reaction.

The reactant solution was cooled down to the room temperature and subjected to precipitation with ultrapure water. The precipitate was washed with ultrapure water at about 70° C. until a complete removal of the acidic portion and dried out to yield the sulfonated polymer of the Formula 8a.

Nuclear magnetic resonance ($^1$H NMR) spectrometer was used to identify the polymer of the Formula 8a. The spectrum is presented in FIG. 3.

Figure 2:
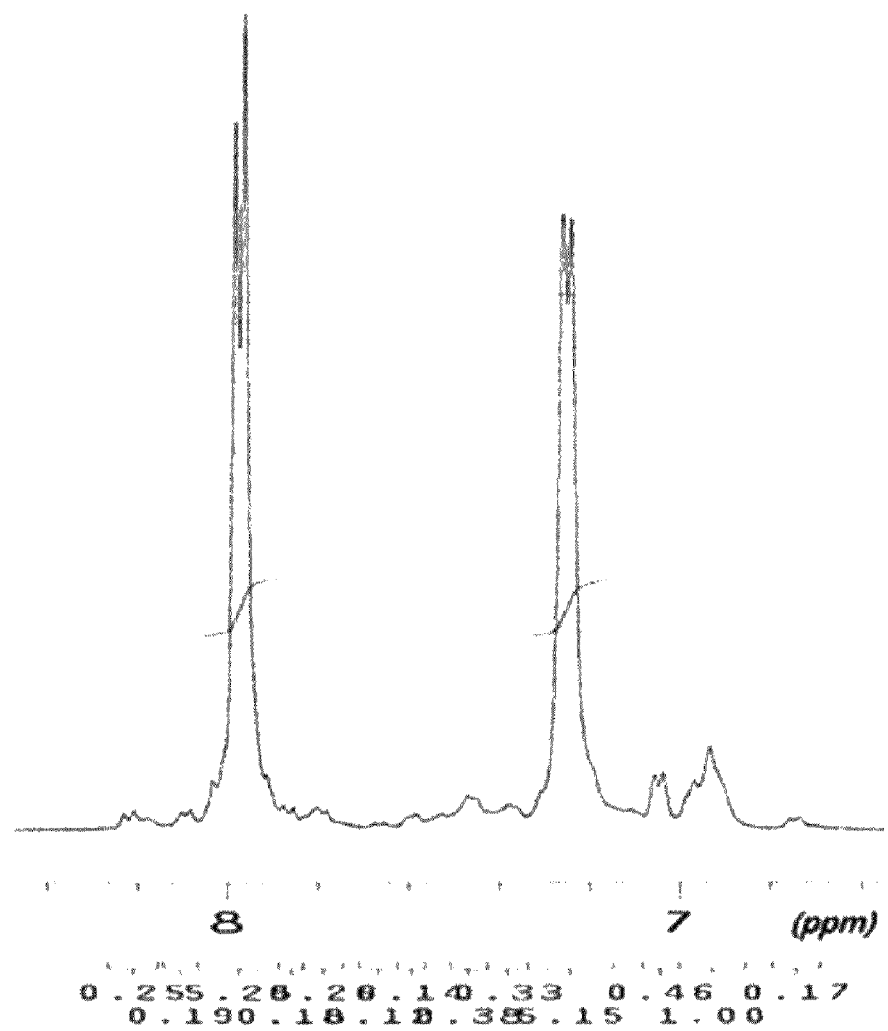
FIGS. 2 and 3 are graphs showing the NMR spectra of the polymers according to other examples of the present invention.
Figure 3:
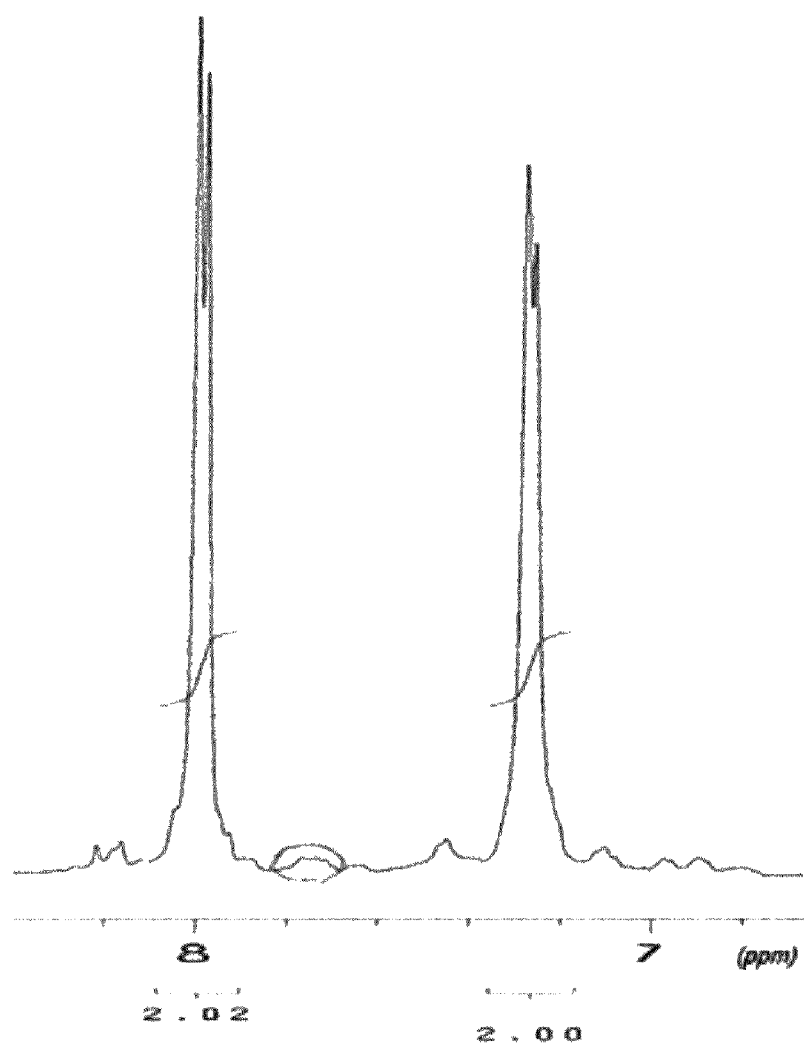

As can be seen from FIG. 3, a sulfonic acid group is introduced into the side chain of the repeating unit in the polymer of the Formula 7a, so the peak at 7.0 ppm shown in FIG. 2 disappeared and a broad peak (circled in FIG. 3) at 7.7-7.8 ppm shows up. The broad peak results from a downfield shift of hydrogen at alpha-position of the sulfonic acid group, which can be identified through a peak area ratio.

[Formula 7b]

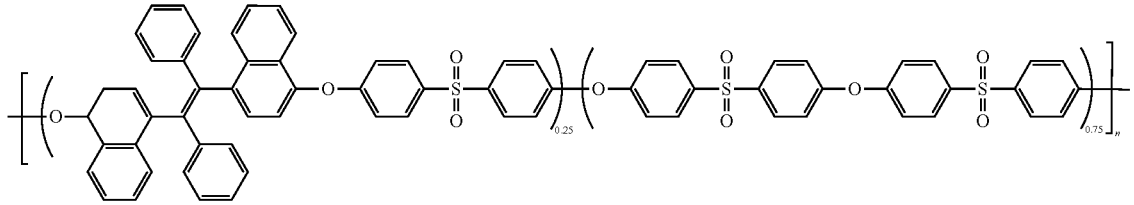

Example 3-1

A sulfonated polymer (m=0.2) represented by the following Formula 8a was synthesized as follows.

First, about 100 g of the polymer of the Formula 7a (Example 2-1) was dissolved in about 1 L of sulfuric acid, and the

[Formula 8a]

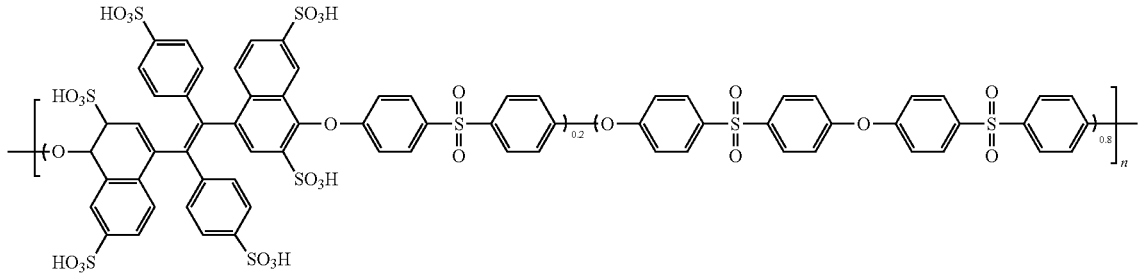

Example 3-2

A sulfonated polymer (m=0.25) represented by the following Formula 8b was synthesized as follows.

First, about 100 g of the polymer of the Formula 7b (Example 2-2) was dissolved in about 1 L of sulfuric acid, and the reactant solution was put in a reactor and heated to about 60° C. for about 12 hours for a reaction.

The reactant solution was cooled down to the room temperature and subjected to precipitation with ultrapure water. The precipitate was washed with ultrapure water at about 70° C. until a complete removal of the acidic portion and dried out to yield the sulfonated polymer of the Formula 8b.

average molecular weight (Mw) and polydispersity index (PDI=Mw/Mn) using chromatography. The measurement results are presented in Table 1. The instrument and conditions for the measurements are given as follows:

GPC system: Waters 2414, supplied by Waters

Column: HR 3/4/5 column, supplied by Waters

Temperature: 100□

Elution solvent: N-methylpyrrolidone

Elution rate: 0.8 mL/min

Reference substance: Polymethylmethacrylate (PMMA)

[Formula 8b]

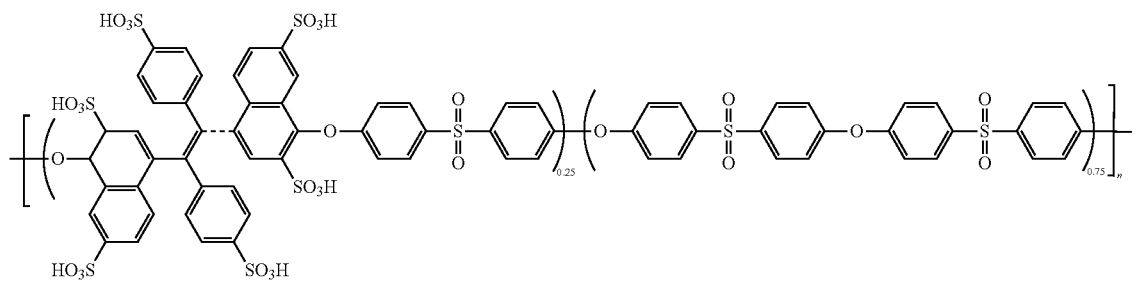

Example 4-1

About 1 g of the proton-conducting polymer obtained in Example 3-1 was dissolved in N,N-dimethylacetamide to prepare a casting solution. The solution was cast on a glass plate, heated up to about 60° C. for about 3 hours, and then dried under vacuum at about 120° C. for about 24 hours to form a polymer electrolyte membrane about 30 μm in thickness.

The polymer electrolyte membrane was immersed in a sulfuric acid solution (about 0.5 M, 80° C.) for about 24 hours and then in pure water (about 80° C.) for 24 hours.

Example 4-2

About 1 g of the proton-conducting polymer obtained in Example 3-2 was dissolved in N,N-dimethylacetamide to prepare a casting solution. The solution was cast on a glass plate, heated up to about 60° C. for about 3 hours, and then dried under vacuum at about 120° C. for about 24 hours to form a polymer electrolyte membrane about 30 μm in thickness.

The polymer electrolyte membrane was immersed in a sulfuric acid solution (about 0.5 M, 80□) for about 24 hours and then in pure water (about 80□) for 24 hours.

Comparative Example 1

There was provided a commercially available polymer electrolyte membrane, Nafion-211 (manufactured by DuPont).

Experimental Example

1) Measurement of Molecular Weight and Polydispersity Index of Polymer

The polymers having a sulfonic acid group as prepared in Examples 3-1 and 3-2 were measured in regard to weight 2) Measurement of Proton Conductivity of Electrolyte Membrane Each of the polymer electrolyte membranes of Examples 4-1 and 4-2 and Comparative Example 1 was sandwiched between two 2.54 cm² electrodes and then measured in regard to the initial resistance at 30° C. with a potential analyzer. The proton conductivity was determined according to the following equation 1. The calculation results for the proton conductivity are presented in Table 1.

Proton Conductivity (S/cm)=[Electrolyte Membrane Thickness (cm)/Area (cm²)]×Initial Resistance (1/ohm)     [Equation 1]

3) Measurement of Methanol Permeability of Electrolyte Membrane

Each of the polymer electrolyte membranes prepared in Examples 4-1 and 4-2, and Comparative Example 1 was placed between two methanol-permeable cell compartments and fixed with an epoxy adhesive. The one compartment was filled with 15 mL of aqueous 1M methanol solution, and the other was filled with 15 mL of distilled water. A volume of 1 μL of the distilled water in the first compartment was withdrawn at ten-minute intervals, and the compartment was then refilled with 10 μL of distilled water each time. The withdrawn sample was injected into a gas chromatograph to measure the methanol concentration. The methanol concentration was plotted as a function of time in a graph, and the methanol permeability was calculated from the slope of the graph according to the following equation 2. The results are presented in Table 1.

In the equation 2 below, the volume (15 cm³) of the solution, the area (7.06 cm²) of the electrolyte membrane, and the methanol concentration (1 M=about 32,000 ppm) were each constant.

$P=(S \times V \times L)/(A \times C)$     [Equation 2]

in which P is methanol permeability [cm²/sec]; S is the slope [ppm/s]; V is the volume (cm³) of the solution; L is the thickness (cm) of the electrolyte membrane; A is the area (cm²) of the electrolyte membrane; and C is the methanol concentration (ppm).

4) Measurement of Ion Exchange Capacity of Electrolyte Membrane

Each of the polymer electrolyte membranes prepared in Examples 4-1 and 4-2, and Comparative Example 1 was immersed in 2N HCl for about 24 hours, and the ion exchanger of the polymer electrolyte membrane was converted to the proton form. The polymer electrolyte membrane was dried to constant weight at 120° C. and weighed to determine the dry weight.

Subsequently, the polymer electrolyte membrane was immersed in 5 mL of an aqueous saturated NaCl solution and, after addition of ion exchange water (50 mL), kept for about 24 hours. 0.01 mol/L of sodium hydroxide was slowly added by titration to the solution in which the polymer electrolyte membrane was immersed, to determine the neutral point.

The ion exchange capacity (IEC) of the polymer electrolyte membrane was calculated from the absolute dry weight of the polymer electrolyte membrane and the used amount of HCl for neutralization. The results are presented in Table 1.

5) Measurement of Water Uptake of Electrolyte Membrane

Each of the polymer electrolyte membranes prepared in Examples 4-1 and 4-2, and Comparative Example 1 was measured in regard to the dry weight in the same manner as described above in the measurement of ion exchange capacity.

Subsequently, each polymer electrolyte membrane was immersed in pure water at about 80° C. for about 24 hours, wiped out to eliminate water, and weighed to determine the wet weight.

The water uptake was calculated from the wet weight and the dry weight. The results are presented in Table 1.

6) Measurement of Swelling (Area and Thickness) of Electrolyte Membrane

Each of the polymer electrolyte membranes prepared in Examples 4-1 and 4-2, and Comparative Example 1 was immersed in pure water at about 80° C. for about 24 hours, and the water-absorbing electrolyte membrane (i.e., wet membrane) was measured in regard to area and thickness. Apart from this, each polymer electrolyte membrane dried under pressure at about 100° C. (i.e., dry membrane) was also measured in regard to area and thickness.

The swelling of the electrolyte membrane was determined according to the following equation 3. The results are presented in Table 1.

Swelling (area, %)=(Wet membrane area−Dry membrane area)/Dry membrane area×100

Swelling (thickness, %)=(Wet membrane thickness−Dry membrane thickness)/Dry membrane thickness×100     [Equation 3]

TABLE 1

| Div. | | Example 4-1 | Example 4-2 | Comparative Example 1 |
|---|---|---|---|---|
| Polymer | Type | Example 3-1 | Example 3-2 | — |
| | Weight Average Molecular Weight (×10³) | 51.5 | 64.3 | — |
| | Polydispersity | 1.43 | 1.59 | — |
| Electrolyte Membrane | Ion Exchange Capacity (meq./g) | 2.07 | 2.35 | 0.91 |
| | Proton Conductivity (S/cm) | $4.3 \times 10^{-3}$ | $4.9 \times 10^{-3}$ | $3.5 \times 10^{-3}$ |
| | Methanol Permeability (cm²/S) | $7.6 \times 10^{-7}$ | $9.1 \times 10^{-7}$ | $2.1 \times 10^{-6}$ |
| | Water Uptake (%) | 7 | 16 | 30 |
| | Swelling (Area, %) | 4 | 8 | 20 |
| | Swelling (Thickness, %) | 3 | 7 | 16 |

As can be seen from the Table 1, compared with the existing commercially available electrolyte membrane (Comparative Example 1: Nafion), the polymer electrolyte membranes according to Examples 4-1 and 4-2, which comprise the proton-conducting polymers of Example 3-1 and 3-2, respectively, showed equivalent or higher ion exchange capacity and proton conductivity, with lower methanol permeability and improved dimensional stability.

Sumiko Matsumura et al. in McGill University of Canada proposed a synthesis of a proton-conducting polymer that involves introduction of a hexaphenyl structure at each end of three branches of the poly(ether-ketone) prepared from 1,3,5-tris(4-(4-fluorophenylsulfonyl)phenyl)benzene and, then conducting a sulfonation reaction (see, e.g., *Macromolecules*, volume 41, pp. 281□284). According to this paper, the proton-conducting polymer of poly(ether-ketone) had an ion exchange capacity of 1.05 meq./g, a water uptake of 43%, and a conductivity of about 92% with respect to Nafion.

In contrast, the polymer electrolyte membranes of Examples 4-1 and 4-2 showed an ion exchange capacity of 2.07 meq./g and 2.35 meq./g; a water uptake of 7% and 16%; an area-based swelling of 4% and 8%, and a thickness-based swelling of 3% and 7%, respectively.

As a result, the proton-conducting polymer of the present invention, which has more acid groups introduced on the side chain of the repeating unit rather than at the polymer ends, is far superior in performance to Sumiko Matsumura's electrolyte membrane using poly(ether-ketone) or Nafion that contain sulfonic acid groups only at three polymer ends.

What is claimed is:

1. A proton-conducting polymer represented by the following Formula 1:

[Formula 1]

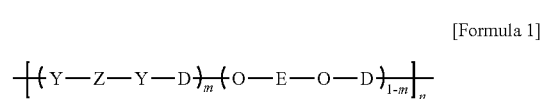

wherein m is 0.01 to 0.99;
n is an integer from 10 to 1,000;
Y is independently a chemical bond, oxygen (O), or sulfur (S);
D and E are independently a divalent linking group comprising at least one selected from the group consisting of a substituted or unsubstituted C1-C10 alkylene group, a substituted or unsubstituted C2-C10 alkenylene group, a substituted or unsubstituted C6-C20 arylene group, a sulfonyl group (—(SO₂)—), and a carbonyl group (—(C=O)—); and Z is represented by the following Formula 2a:

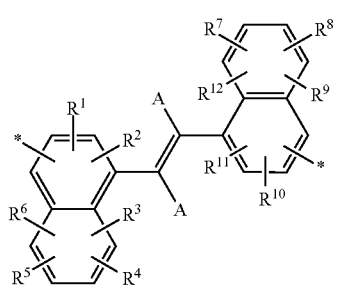

[Formula 2a]

wherein A is independently any one of substituents represented by the following Formula 3a:

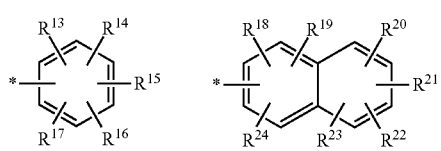

[Formula 3a]

wherein $R^1$ to $R^{24}$ are independently hydrogen; a sulfonic acid group (—SO₃M); a phosphate group (—PO₃M); a carboxylic acid group (—CO₂M, wherein M is H⁺, Na⁺, or K⁺); a sulfonyl group; or a C1-C10 alkyl or C6-C20 aryl group substituted with a sulfonic acid group, a phosphate group, a carboxylic acid group, or a sulfonyl group.

2. The proton-conducting polymer of claim 1, wherein D of the Formula 1 is independently a divalent linking group derived from a compound selected from the group represented by the following Formula 4a:

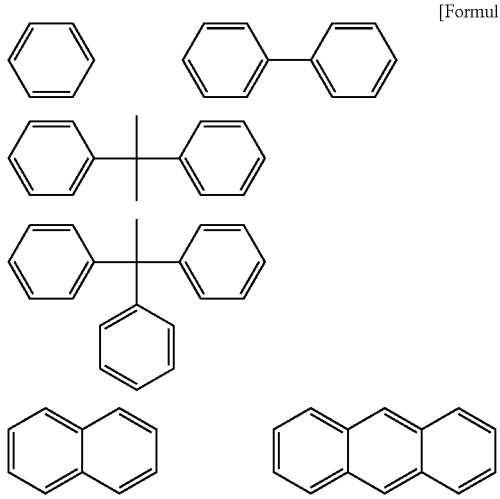

[Formula 4a]

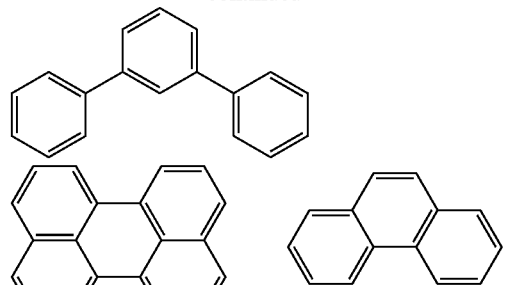

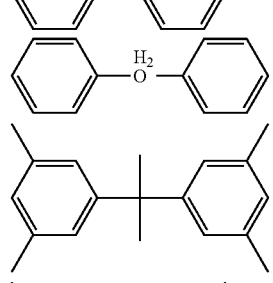

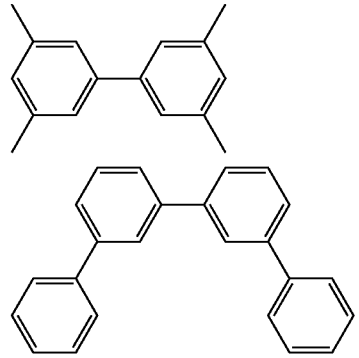

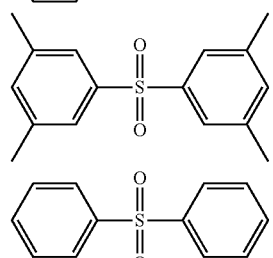

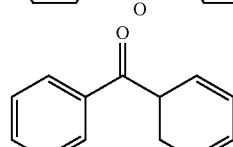

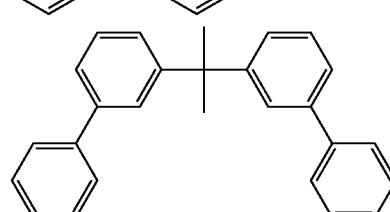

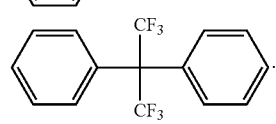

3. The proton-conducting polymer of claim 1, wherein E of the Formula 1 is independently a divalent linking group derived from a compound selected from the group represented by the following Formula 5a:

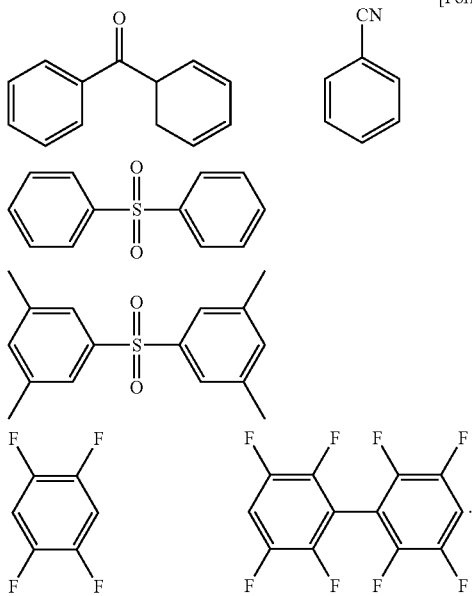

[Formula 5a]

4. The proton-conducting polymer ° C. claim 1, wherein the polymer is a random copolymer or a block copolymer.

5. The proton-conducting polymer of claim 1, wherein the polymer has a weight average molecular weight of 5,000 to 1,000,000.

6. An electrolyte membrane comprising the proton-conducting polymer as claimed in claim 1.

7. The electrolyte membrane as claimed in claim 6, further comprising at least one polymer selected from the group consisting of polyimide, polyether ketone, polysulfone, polyether sulfone, polyether ether sulfone, polybenzimidazole, polyphenylene oxide, polyphenylene sulfide, polystyrene, polytrifluorostyrene sulfonic acid, polystyrene sulfonic acid, polyvinylidene fluoride, polyurethane, and a branched sulfonated polysulfone ketone copolymer.

8. The electrolyte membrane of claim 6, further comprising at least one inorganic substance selected from the group consisting of silicon dioxide ($SiO_2$), titanium dioxide ($TiO_2$), inorganic phosphate, sulfonated silicon dioxide (sulfonated $SiO_2$), sulfonated zirconium oxide (sulfonated ZrO), and sulfonated zirconium phosphate (sulfonated ZrP).

9. The electrolyte membrane of claim 6, further comprising at least one porous support particle selected from the group consisting of silica, alumina, zirconia, and zeolite.

10. A membrane-electrode assembly comprising the electrolyte membrane as claimed in claim 6.

11. A fuel cell comprising the membrane-electrode assembly as claimed in claim 10.

* * * * *